United States Patent
Schoenherr

(10) Patent No.: US 8,287,000 B2
(45) Date of Patent: Oct. 16, 2012

(54) FLUID TANK DEAIRATION

(75) Inventor: Stephan Schoenherr, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 444 days.

(21) Appl. No.: 12/693,659

(22) Filed: Jan. 26, 2010

(65) Prior Publication Data

US 2010/0187238 A1    Jul. 29, 2010

(30) Foreign Application Priority Data

Jan. 29, 2009   (GB) .................................. 0901441.6

(51) Int. Cl.
*B60P 3/22* (2006.01)
(52) U.S. Cl. ..................... 280/834; 280/830; 220/565
(58) Field of Classification Search .................. 280/834, 280/830, 831; 220/565, 567.2, 4.14, 750, 220/749; 137/587
See application file for complete search history.

(56) References Cited

U.S. PATENT DOCUMENTS

| | | | |
|---|---|---|---|
| 2,593,394 A * | 4/1952 | Rockwell .......................... 60/555 |
| 3,610,220 A * | 10/1971 | Yamada et al. ................ 123/518 |
| 3,693,348 A * | 9/1972 | Mercier ........................... 60/325 |
| 4,052,852 A * | 10/1977 | Hart ................................ 60/478 |
| 4,605,032 A | 8/1986 | Hayashi et al. |
| 5,392,804 A | 2/1995 | Kondo et al. |
| 5,687,778 A | 11/1997 | Harris |
| 5,860,458 A | 1/1999 | Benjey et al. |
| 2004/0055582 A1 | 3/2004 | Yanase et al. |

FOREIGN PATENT DOCUMENTS

EP    0340062 A1    2/1989

* cited by examiner

Primary Examiner — Tashiana Adams

(57) ABSTRACT

A fluid tank (20) has at least two deaeration ports (24,25) provided in at least two upper regions of the tank. A first conduit (30) is connected at one end to one deaeration port (24) and connected at its other end to a compensating reservoir (50) at a higher level. At least one additional conduit (40) is connected at one end to an other deaeration port (25) and also connected at its other end to the compensating reservoir (50). A filter (60) is connected with the upper part of the reservoir to allow air to escape from the reservoir. The height of the compensating reservoir (50) above the tank (20) ensures that the filter (60) is protected from immersion in tank fluid and deaeration is ensured at normal working inclinations of the tank. The tank may be provided by part of the chassis of a tractor which is located below a cab of the tractor.

4 Claims, 5 Drawing Sheets

FLUID TANK DEAIRATION

CROSS-REFERENCE TO RELATED APPLICATION

The present application claims the benefit of and priority from Great Britain Application No. 0901441.6, filed Jan. 29, 2009, the entire disclosure of which is hereby incorporated by reference.

FIELD OF THE INVENTION

The invention relates to a fluid tank deaeration for vehicles, especially tractors or small range tractors used in vineyards.

BACKGROUND

Fluid tanks are used for many purposes in vehicles. It is the main task to store a maximum amount of fluid whilst requiring a minimum installation space. Thereby, fluid tanks are designed in a very complex shape to use the installation space available. These tanks are also used in the hydraulic circuit of a vehicle, e.g. in agricultural machinery like a tractor, which is supplying the required oil to tractor-related consumers e.g. the front and rear lifting unit or to consumers which relate to attachments e.g. hydraulic cylinders lifting a plough. The performance of this hydraulic circuit is mainly influenced by the oil capacity of the tank which is limiting the delivery capacity of the pump to consumers. As these circuits are closed circuits, fluid is returning into the tank after supplying the consumers.

In addition to this, fluid tanks also serve to separate stored fluids, e.g. hydraulic or lubrication oil, from air which is brought into fluid systems during refilling or by consumers if the fluid is circulating inside a circuit. As air causes pump damage, e.g. cavitation, and reduce system performance this air has to be discharged to the atmosphere. Therefore, a port is provided which connects the tank to the atmosphere.

To avoid the discharge of fluid carried by the air to the environment, fluid separators (filters) are installed at these ports. These separators are equipped with porous filter elements, consisting of e.g. filter paper, non-woven material or wire mesh. All these materials have in common, that they are only capable of dealing with small amounts of fluid carried by the air known as fluid mist. If they are completely coated by the stored fluid, the pores of the filter element are blocked and the filter has to be changed. So it is also a requirement of a deaeration system to avoid complete washing of the separator/filter element with the stored fluid. This is achieved by installing the separator above in a top wall of the tank. Even if the filters are not washed completely it is necessary to exchange them from time to time.

Vehicles of the kind mentioned above, e.g. small and vineyard tractors, are designed to have short overall dimensions to be used for special jobs in narrow environments or on extreme inclined fields. Especially if it is necessary to drive at inclined hills perpendicular or along to the direction of inclination, the oil level in fluid tanks vary very much during operation.

It is also well known to use chassis or housing parts of such tractors as a reservoir for several fluids. This is very common for vehicles using hydrostatic or hydrostatic-mechanical torque split transmissions. As these transmission do not need a clutch to disconnect the engine from the transmission, the free space is used to storage fluids. The fluid can be hydraulic fluid which is used for transmission and/or the hydraulic circuit of a agricultural working machinery.

This integration into the vehicle requires a very complex tank design which is typically of a generally U-shaped configuration which is very difficult for deaeration systems.

Installing a number of separators in different positions increases the costs and maintenance work.

SUMMARY

Thus according to the present invention there is provided a fluid tank having at least two deaeration ports provided in at least two upper regions of the tank, a first conduit connected at one end to one deaeration port and connected at its other end to a compensating reservoir at a higher level, at least one additional conduit connected at one end another deaeration port and also connected at its other end to the compensating reservoir, a filter connected with the upper part of the reservoir to allow air to escape from the reservoir, the height of the compensating reservoir above the tank ensuring that the filter is protected from immersion in tank fluid and deaeration is ensured at normal working inclinations of the tank.

The tank may be for use in a tractor and may be of a general U-shaped configuration with a deaeration port provided in the upper region of each limb of the tank.

In such an arrangement the filter may be installed on the tractor at a location where it is readily accessible for checking or exchanging.

The tank may be part of the chassis of the tractor which is located below a cab of the tractor Using a tank arrangement in accordance with the present invention installation space for deaeration system is reduced in areas of limited space whilst maximum oil filling level and therefore oil capacity of the tank is increased. In addition the separator (filter) can be installed at a high position where the space is available.

BRIEF DESCRIPTION OF THE DRAWINGS

The present invention will know be described, by way of example only, with reference to the accompanying drawing in which.

DESCRIPTION OF EXAMPLE EMBODIMENTS

Figure 1:
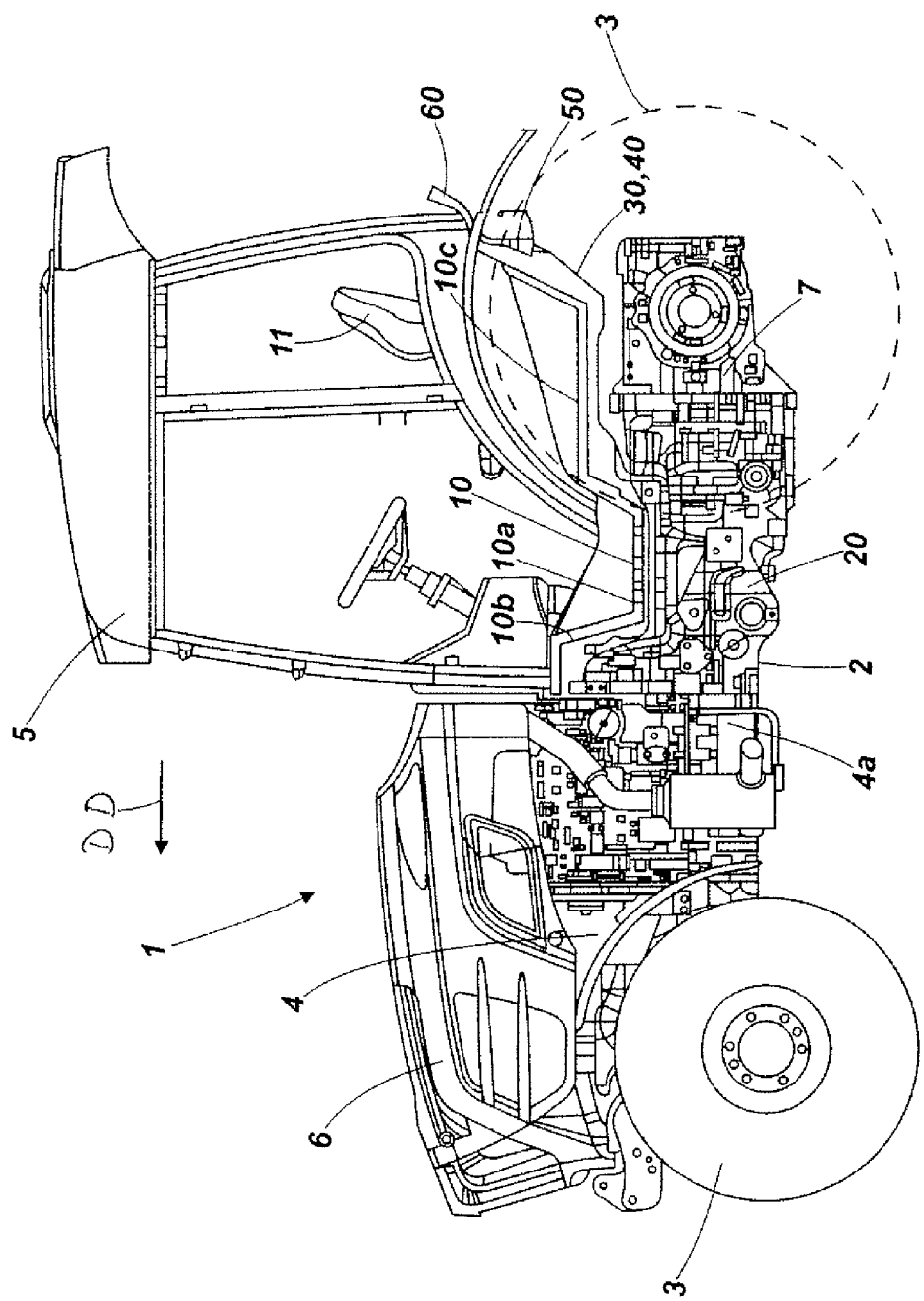
FIG. 1 shows an overall side view of a vehicle, especially a tractor.

FIG. 1 shows a tractor 1 comprising a chassis 2, wheels 3, an engine 4, a driver cab 5 and a bonnet 6. A chassis part 2 is used for fluid storage forming a an oil tank 20 for the hydraulic oil circuit of the tractor. Inside this chassis part 2, also main components of the hydrostatic-mechanical torque split transmission are installed (not shown). At the front end of this chassis part, the engine block 4*a* is installed. At the rear end of the chassis part 2, the rear axle housing 7 is placed.

For deaeration, in accordance with the present invention, the oil tank 20 is connected via two pipes 30,40 to a compensating reservoir 50 which is again connected to a separator 60 installed in the rear of the driver cab 5 in a easily accessible position. The oil tank 20 is below the floor 10 of the cab 5, which is partly drawn in a section through the symmetric axis of the tractor 1. In the middle area of the cab, the floor 10 has a flat portion 10a on which the drivers feet (not shown) rest. In driving direction DD the floor 10 is ascending forming a second portion 10b which is placed under the steering column. In the opposite direction, the floor 10 has a stepped portion 10c on which the seat 11 is mounted. This design is providing minimum cab dimension whilst meeting all comfort requirements relating to the drivers space.

Figure 2:
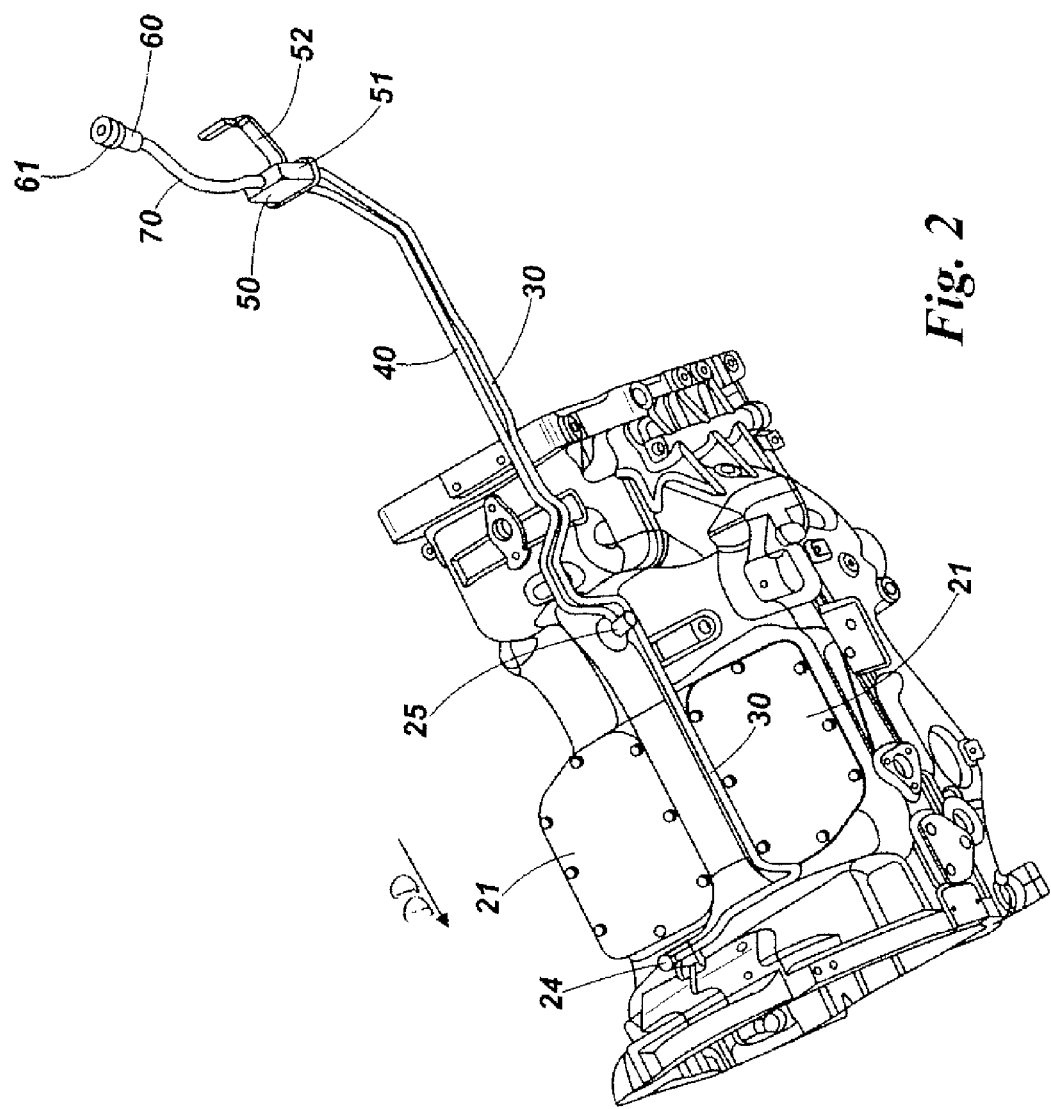
FIG. 2 shows a perspective view of the oil tank system according the present invention.
Figure 3:
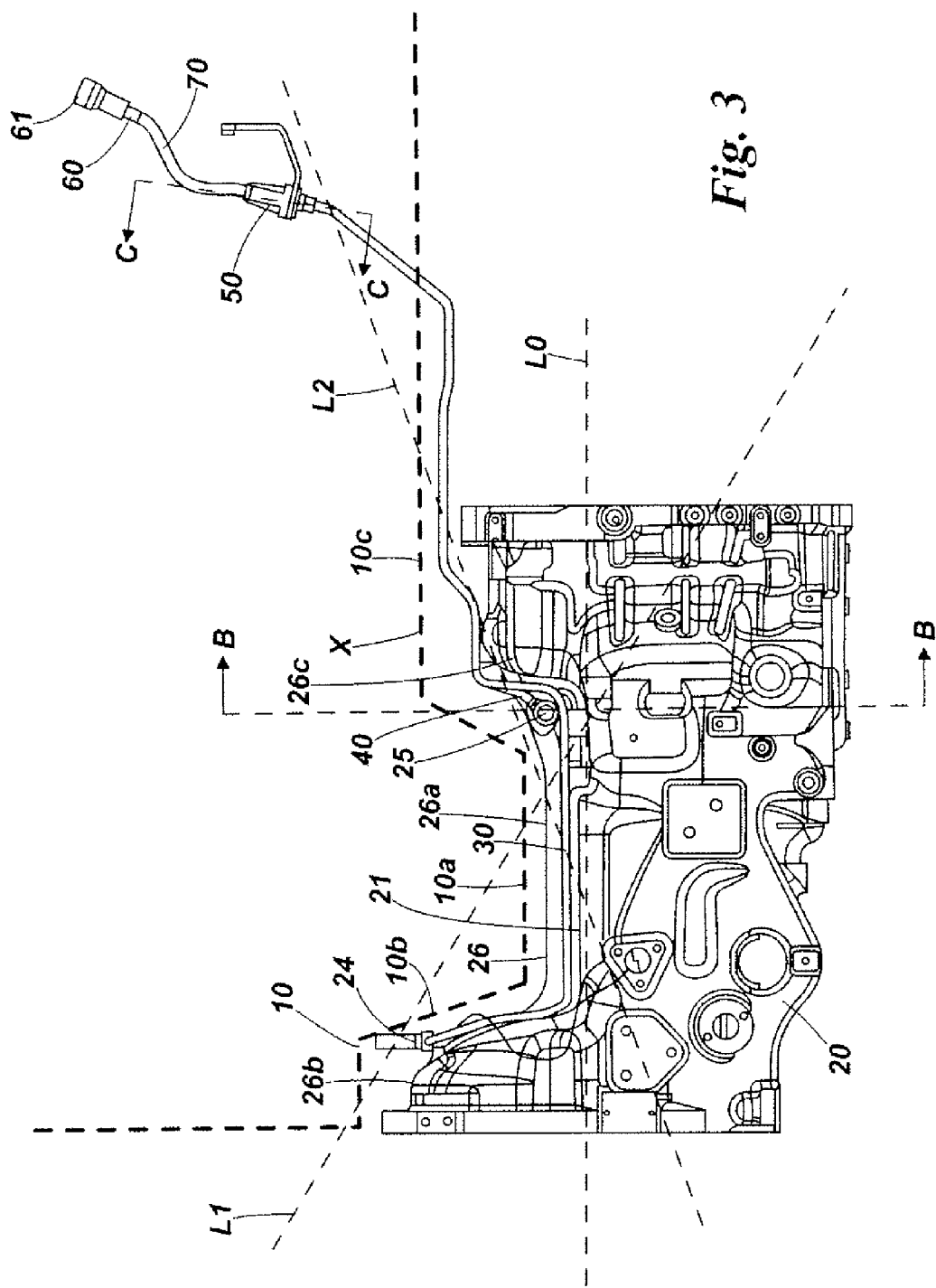
FIG. 3 shows a side view of the oil tank system according the present invention.
Figure 4:
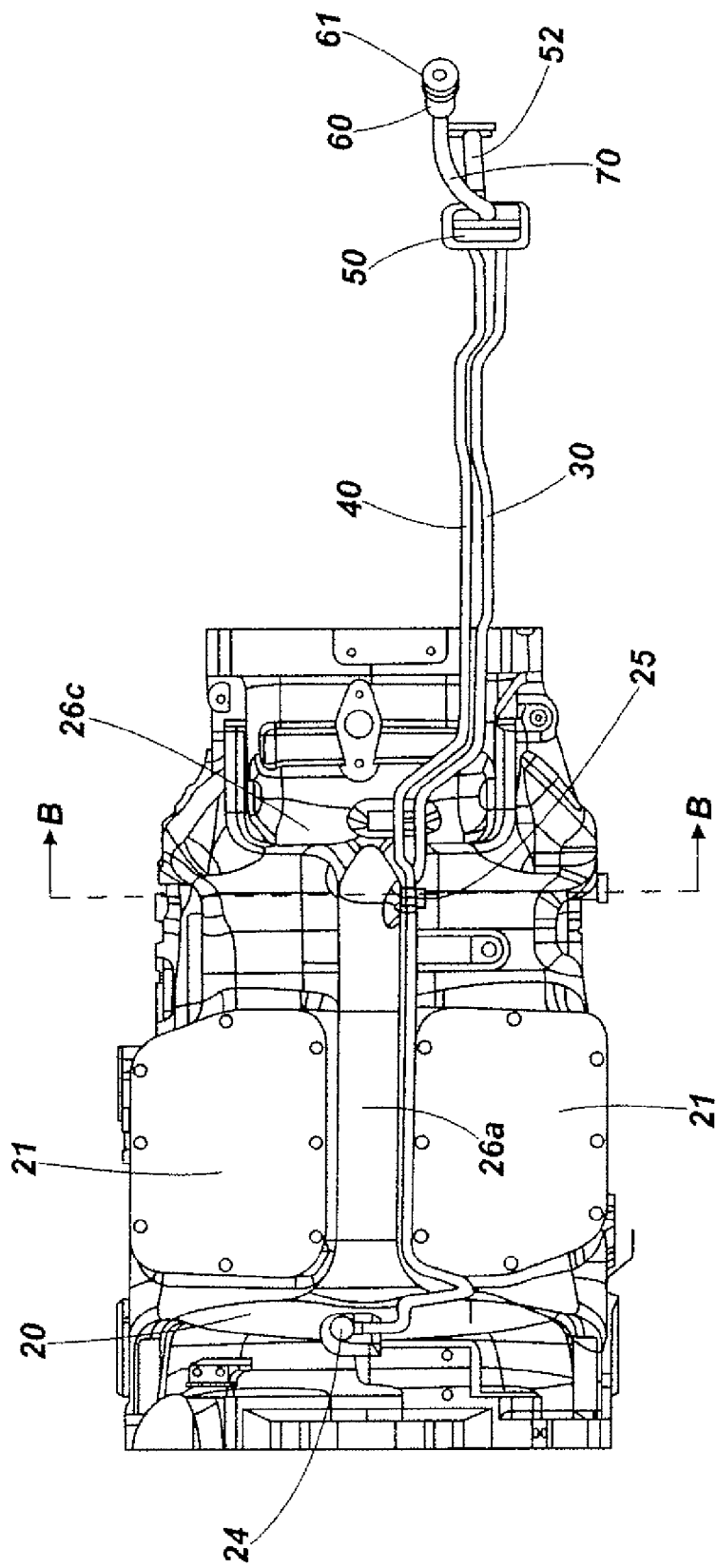
FIG. 4 shows a top view of the oil tank system according the present invention.

FIG. 2 to 4 shows the oil tank 20 having two covers 21 to provide access to components inside the oil tank 20, e.g. the drive shaft or the hydraulic oil pump (not shown). The oil tank 20 has various ports for connecting components which relate to the hydraulic circuit of the tractor. One port connects the pump (not shown) inside the oil tank 20 with different consumers installed on the tractor or on attachments via piping which is not shown for clarity reasons. As the pump is constantly pumping oil through the closed circuit, return lines (not shown) are connected to ports in the oil tank 20. As these details are well known no further details are required concerning the hydraulic oil supply on vehicles. For clarity reasons these details are left out in the drawings.

Pipe 30 of the deaeration system is connected to a port 24 in the front area of the oil tank 20 whilst pipe 40 is connected to a port 25 in the rear area of the oil tank 20. Both pipes 30,40 are connected to a compensating reservoir 50 as previously stated. The compensating reservoir 50 is then connected to the oil separator 60 via piping 70. The separator 60 is equipped with a filter element 61 which can be detached by thread connection.

The type of ports and connectors used for connecting the pipes or components to each other are well known and therefore not described in detail.

In FIG. 3 the floor 10 of the cab 5 is shown diagrammatically as a dashed line X only for clarity reasons. The upper contour 26 of the oil tank 20 is following the floor contour X to achieve maximum storage volume. The oil tank 20 is basically U-shaped with a lower upper contour 26a in the middle beneath flat portion 10a of the cab floor 50. Towards its both longitudinal ends the oil tank has higher upper contour 26b, 26c. Front upper contour 26b is placed beneath the ascending second portion 10b of the cab floor 10 in the front area while rear upper contour 26c is placed beneath the stepped portion 10c of the cab floor.

Figure 6:
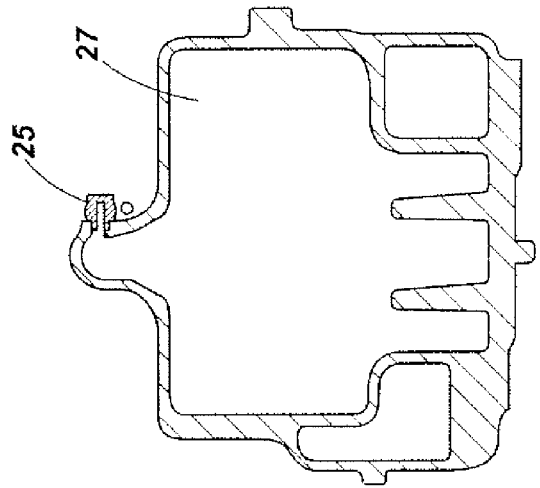
FIG. 6 shows section B-B of FIG. 3 and FIG. 4.

The oil tank 20 forms a generally U-shaped cavity 27 by the inner contour of the housing part 28 and two sealing covers 29 in the front and rear. Components inside the oil tank 20 are not shown. The front upper contour 26b is equipped with the port 24 by a bore 28a in the housing part 27. Port 25 is connected to the cavity 27 of the tank 20 as can be seen from FIG. 6. The lower upper contour 26a in the middle is provided with a larger wall thickness to improve longitudinal stiffness of the housing parts.

Figure 7:
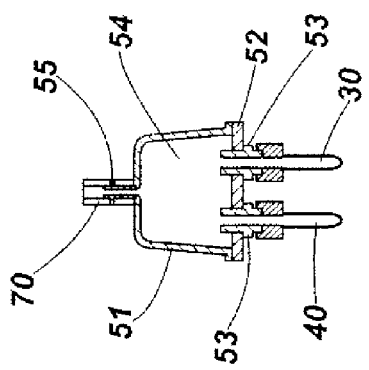
FIG. 7 shows section C-C of FIG. 3.

FIG. 7 shows a section through the compensating reservoir 50 which is formed by a hollow body 51 which is opened on one side. The open side is closed by a cover bracket 52 which also serves to fix the reservoir in position. Ports 53 are provided to connect pipes 30,40 and therefore cavity 27 of the oil tank 20 to the cavity 54 of the compensating reservoir 50. An additional port 55 is provided to connect pipe 70 to the separator 60.

Figure 5:
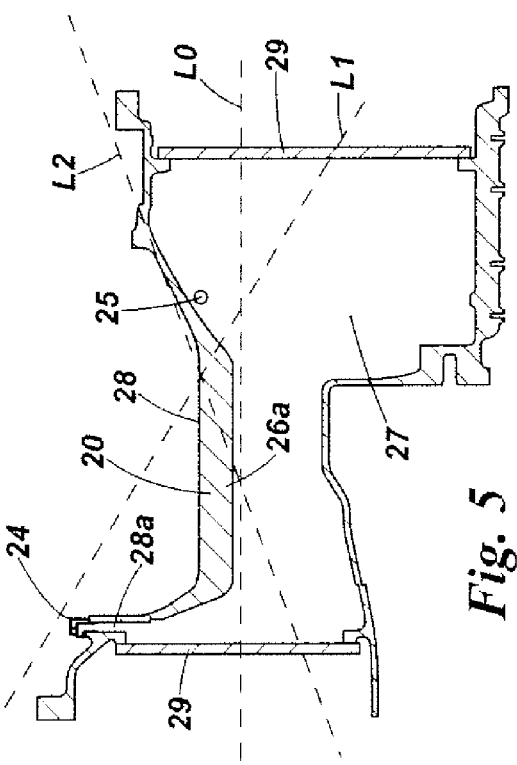
FIG. 5 shows section A-A of FIG. 4.

Returning to FIGS. 3 and 5, the deaeration is now explained.

If the vehicle is standing on plane ground without inclination, oil is at level L0. Both ports 24 and 25 are above oil level, so air in the system can be discharged through both ports.

If the vehicle is going downhill at its maximum downhill capacity of about 30°, oil is at level L1. Port 24 is under oil level while port 25 is above for deaeration.

If the vehicle is going uphill at its maximum uphill capacity of about 30°, oil is at level L2. Port 25 is under oil level while port 24 is above for deaeration.

As both ports are connected to the compensating reservoir 50 as shown in FIG. 3, air can be discharged at every inclination. If the vehicle is going over changing ground and the inclination is changing, oil can rest inside the pipes caused by suction effects. This oil can be guided back to the cavity 27 through one of the ports 24 or 25. Even if, during maximum inclination, oil enters the pipes 30,40 caused by swash movement and even enters the compensating reservoir 50 this oil and any suspended oil droplets will rest in the bottom portion of the reservoir cavity 54 thus ensuring that air is discharged from the upper part of cavity 54 and that the level of oil in the reservoir 50 does not reach the filter element 61 of the separator 60 which only allows air to pass through into the atmosphere.

The filter element 61 is installed in an easy accessible position in the rear of the cab for cleaning and maintenance.

Moreover, although the above described embodiment includes a oil tank integrated in chassis parts and used to provide oil for the hydraulic circuit of a tractor, it is envisaged that the deaeration system described above could be used for any other fluid or any other tank being installed elsewhere in a vehicle.

It is envisaged that the tank may have more than two limbs with the upper regions of each limb having a port and conduit according to the present invention.

What is claimed is:

1. A fluid tank having at least two deaeration ports provided in at least two upper regions of the tank, a first conduit connected at one end to one deaeration port and connected at its other end to a compensating reservoir at a higher level, at least one additional conduit connected at one end to an other deaeration port and also connected at its other end to the compensating reservoir, a filter connected with the upper part of the reservoir to allow air to escape from the reservoir, the height of the compensating reservoir above the tank ensuring that the filter is protected from immersion in tank fluid and deaeration is ensured at normal working inclinations of the tank.

2. A fluid tank according to claim 1 for use in a tractor in which tank is of a general U-shaped configuration with a deaeration port provided in the upper region of each limb of the tank.

3. A fluid tank according to claim 2 in which the filter is installed on the tractor at a location where it is readily accessible for checking or exchanging.

4. A fluid tank according to claim 2 in which the tank is provided by part of the chassis of the tractor which is located below a cab of the tractor.

* * * * *